United States Patent Office
2,914,502
Patented Nov. 24, 1959

2,914,502

PROCESS FOR CURING ORGANOPOLYSILOXANES WITH A HYDROPHOBIC SILICA AND PRODUCT THEREOF

Arthur M. Bueche, Schenectady, N.Y., assignor to General Electric Company, a corporation of New York No Drawing. Application October 15, 1954
Serial No. 462,599

3 Claims. (Cl. 260—37)

This invention concerns organopolysiloxane elastomers containing hydrophobic silicas as fillers. More particularly, this invention relates to organopolysiloxane elastomers containing silica which have been rendered hydrophobic by treatment with alkanols. Still more particularly, this invention relates to organopolysiloxanes containing hydrophobic silicas, said organopolysiloxane compositions being convertible to the solid elastic state without the usual vulcanization agents. This invention is also concerned with the preparation of organopolysiloxane elastomers having good tensile strength and hydrolytic stability.

Silicone rubbers (organopolysiloxane elastomers) are distinctive in their extreme temperature service (—70° to +260° C.), good oil resistance, good ozone resistance, and relative freedom from oxidative degradation up to 260° C. These properties are desirable in many rubber applications.

Heretofore, many fillers have been added to organopolysiloxane elastomers in an attempt to impart various other desirable characteristics thereto, such as strength, toughness, high stretch, small weight loss, slight dimensional change, etc. Warrick (U.S. Patent 2,541,137) describes the preparation of organopolysiloxane elastomers containing hydrophilic silicas as fillers. But in the conversion of the organopolysiloxanes to the solid elastic state. Warrick uses such vulcanization agents as benzoyl peroxide and tertiary butyl perbenzoate. The use of such curing agents is accompanied by the disadvantage that after the product is converted to the solid, elastic, substantially infusible and insoluble state, the presence of chemical curing agents tends to affect deleteriously some of the properties of the cured product, such as heat-aging properties, electrical properties, etc. Furthermore, organopolysiloxane elastomers of the prior art could not be effectively cured in the presence of many chemicals which prevent peroxide cure, such as antioxidants, etc.

Most of the silicas employed in the prior art have been hydrophilic (i.e., possessing water affinity). Since organopolysiloxanes possess organic characteristics, an organophilic silica (i.e., possessing organic affinity) presents a surface more compatible with such compositions while maintaining essentially the same silica sub strata. The silicas employed in my invention are silicas which have been rendered hydrophobic by treatment with alkanols.

I have now discovered that organopolysiloxanes containing hydrophobic surface esterified silicas may be cured without the usual vulcanization agents, such as peroxides, azo compounds, etc. These compositions not only possess good tensile strength and hydrolytic stability but are also free of the deleterious effects of curing agents in the final product.

The organopolysiloxanes employed in this invention are organopolysiloxanes convertible to the solid elastic state. The convertible organopolysiloxane or silicone compositions which may be highly viscous masses, or gummy elastic solids, depending on the state of condensation, the condensing agent employed, the starting organopolysiloxane used to make the convertible organopolysiloxanes, etc., will hereinafter be referred to as "convertible organopolysiloxane" or, more specifically, as "convertible methylpolysiloxane." Although convertible organopolysiloxanes with which the present invention is concerned are well known, for purposes of showing persons skilled in the art the various convertible organopolysiloxanes which may be employed in the practice of the present invention, attention is directed to the convertible organopolysiloxanes disclosed and claimed in Agens Patent 2,448,756 and Sprung et al. Patent 2,448,-556, both issued September 7, 1948, Sprung Patent 2,484,595, issued October 11, 1949, Krieble et al. Patent 2,457,688, issued December 28, 1948, Hyde Patent 2,490,357, issued December 6, 1949, Marsden Patent 2,521,528, issued September 5, 1950, and Warrick Patent 2,541,137, issued February 13, 1951.

It will, of course, be understood by those skilled in the art that other convertible organopolysiloxanes containing the same or different silicon-bonded organic substituents such as hydrocarbons and halohydrocarbons (e.g., methyl, ethyl, propyl, butyl, octyl, phenyl, tolyl, xylyl, benzyl, phenylethyl, naphthyl, chlorophenyl, dibromophenyl, both methyl and phenyl, etc., radicals) connected to silicon atoms by carbon-silicon linkages, may be employed without departing from the scope of the invention.

The particular convertible organopolysiloxane used is not critical and may be any one of those described in the foregoing patents and generally obtained by condensing a liquid organopolysiloxane containing an average of from about 1.95 to 2.25, preferably from about 1.98 to about 2.05, silicon-bonded organic groups per silicon atom. The usual condensing agents which may be employed and which are well known in the art may include, for instance, ferric chloride hexahydrate, phenyl phosphoryl chloride, quaternary phosphonium hydroxides and alkoxides, solid quaternary ammonium hydroxides, alkaline condensing agents, such as potassium hydroxide, cesium hydroxide, etc. These convertible organopolysiloxanes generally comprise polymeric diorganosiloxanes which may contain, for example, from 0 to 2 mol percent copolymerized monorganosiloxane, for example, copolymerized monomethylsiloxane. Generally, we prefer to use as the starting liquid organopolysiloxane from which the convertible organopolysiloxanes are prepared, one which contains about 1.999 to 2.01, inclusive, organic groups, for example, methyl groups per silicon atom where more than about 90% of the silicon atoms in the polysiloxane contain 2 silicon-bonded dialkyl groups.

The starting organopolysiloxanes used to make the convertible organopolysiloxanes by condensation thereof preferably comprise organic substituents consisting essentially of monovalent organic radicals attached to silicon through carbon-silicon linkages, there being on the average between 1.95 and 2.25 organic radicals per silicon atom, and in which the siloxane units consist of units of the structural formula $R_2SiO$ where R is preferably a radical of the group consisting of methyl and phenyl radicals. At least 50% of the total number of R groups are preferably methyl radicals. The polysiloxane may be one in which all of the siloxane units are $(CH_3)_2SiO$ or the siloxane may be a copolymer of dimethylsiloxane and a minor amount (e.g., from 1 to 20 mol percent) of any of the following units alone or in combination therewith: $C_6H_5(CH_3)SiO$ and $(C_6H_5)_2SiO$.

Hydrophobic silicas that may be incorporated herein are silicas rendered hydrophobic by treatment with alkanols. The ethyl ester and the preparation thereof are described in my copending application Serial No. 462,600, filed concurrently herewith and assigned to the same assignee as the present application, now abandoned. Other alkanols, such as methyl, propyl, butyl, amyl, heptyl, hexyl, octyl, nonyl, decyl, octadecyl, etc., alcohols, and other members of the homologous series as well as their isomers may be used to surface esterify silicas. The organophilic groups supplied by the alkanols render it hydrophobic by reacting with the silica surface so as to produce alkoxy groups chemically bound to silicon atoms. This esterification is applicable to any composition having an exposed silica surface, finely divided, high surface area silicas of from 1–900 square meters per gram being preferred. The most preferable are those having a surface area between 75–400 square meters per gram. The silicas described in the above copending application may be surface esterified with alkanols and employed in my invention. The methods therein described may also be used in the preparation of other alkyl esters.

The silicas that can be rendered hydrophobic by treatment with alkanols are compositions containing at least a surface of silica. Since the process of rendering silica hydrophobic is a surface reaction, it is immaterial what the sub-surface structure of said silica contains, although homogeneous silicas are preferred. By a silica surface I mean an exposed layer of silicic acid in various states of dehydration, or stated another way, $SiO_2$ in various states of hydration. The surfaces should contain —SiOH groups or silicas which are convertible to such groups during the alkanol treatment. As the silica surface area increases (measured in square meters per gram), a larger number of reactive silicas are present on the surface, thus increasing the alkyl-silicon ratio in the alkanol-treated product. Compositions having a high alkyl-silicon ratio are preferred.

The preparation of silica gels is described by Hurd in Chemical Review, vol. 22, No. 3, June 1938, pages 403–422.

The amount of hydrophobic silica that can be incorporated into organopolysiloxanes varies widely depending on desired properties. The tolerance of silicone gum for the hydrophobic filler may vary with different convertible organopolysiloxanes. Larger amounts of hydrophobic silicas may be incorporated in convertible organopolysiloxanes than is possible with hydrophilic silicas of corresponding surface areas, this larger tolerance being attributed to the organic protective coating. Up to 100 parts by weight of hydrophobic silica may be incorporated into 100 parts by weight of convertible organopolysiloxanes. In the case of hydrophilic silicas, it is difficult to incorporate more than 40–50 parts of hydrophilic silica by weight of organopolysiloxane and still obtain a coherent workable product.

The milling operation may be carried out by adding the convertible organopolysiloxane to the milling rolls followed by hydrophobic silica. After the ingredients are thoroughly mixed, which may be after a few minutes or a few hours of milling depending on the rate of milling and the amount of material being milled, the milled product is removed from the rolls. This milled product may be stored until it is desired to prepare the finished product or may immediately be calendered on heated rolls to form sheet materials, extruded into various elongated shapes, or molded in heated presses to form a cross-linked product of desired shape.

The cure may be carried out by heat and pressure or by heat alone. The temperature used may be from about 100° C. to below the decomposition point of the convertible organopolysiloxane. Generally, 100° to 200° C. is effective, with 125° to 150° C. being the preferred range. During the time that the convertible organopolysiloxane is milled with the filler, a curing agent may be added, if desired. Then the mass is molded to the desired shape and cured to an insoluble infusible elastic material. Although the cure can be completed in the press, it is usually followed by an oven cure. The product is usually kept in the press from 5–30 minutes followed by from 1 to 48 hours or more in an oven.

The invention will be better understood by reference to the following illustrative examples. These examples are presented as illustrative and not for purposes of limitation.

EXAMPLE 1

A methylpolysiloxane gum was prepared by heating octamethylcyclotetrasiloxane with 0.01% by weight potassium hydroxide at 150° C. for about 6 hours. This gum had a room temperature viscosity of about 500,000 centipoises.

EXAMPLE 2

Hydrophobic silica was prepared as follows: 0.15 gram of potassium hydroxide was dissolved in enough ethanol (970 grams) to wet 97 grams of a finely divided powder comprising silica aerogel (Santocel-C), Monsanto Chemical Company), having a surface area of 100–200 square meters per gram. The mixture was heated in a closed bomb to about 375° C. Upon reaching this temperature, the excess alcohol was vented and allowed to escape. The reaction product was cooled for 2 hours in an inert atmosphere, specifically alcohol vapor, to give a free flowing powder which floated on the surface when stirred into boiling water. When stirred into toluene supernatant on water, it was dispersed in the upper toluene layer. In contrast to this, silica aerogel itself was dispersed in boiling water and in the lower aqueous layer of the toluene-water system. These results illustrate the hydrophobic nature of the alcohol-treated product.

EXAMPLE 3

Various amounts of the hydrophobic silica described in Example 2 were milled into the convertible methylpolysiloxane produced in Example 1. The samples were press-cured in the form of sheets for 20 minutes at 125° C. at a pressure of about 500 p.s.i. followed by an oven cure for 27 hours at 150° C.

The formulations are presented in Table I.

Table I

| Sample No. | Grams Methylpolysiloxane, Product of Example 1 | Grams Hydrophobic Silica (Example 2) | Grams Benzoyl Peroxide |
| --- | --- | --- | --- |
| 1 | 25 | 3 | 0.415 |
| 2 | 25 | 6 | 0.415 |
| 3 | 33 | 15 | 0.55 |
| 4 | 5 | 11 | 0.0 |

The physical properties for these samples are found in Table II.

Table II

| Sample No. | Tensile Strength (p.s.i.) | Elongation (Percent) | Tear Strength (lbs./inch) |
| --- | --- | --- | --- |
| 1 | 192 | 600 | |
| 2 | 444 | 467 | |
| 3 | 574 | 130 | |
| 4 | 747 | 500 | 50 |

The rubber prepared without peroxide, Sample No. 4, showed no apparent change after ½ hour in boiling water or after soaking 2 weeks in water at room temperature. It was flexible after being heat-aged in a 250° C. air oven for 129 hours. It showed no tendency to crumble during compounding. The uncured compound did not stiffen or exhibit increase in structure after being stored 3 days at 0% humidity, thus indicating good shelf life.

EXAMPLE 4

A hydrophilic silica aerogel (Santocel-C, Monsanto Chemical Company) in an amount equal to 40 grams was milled into 100 grams of the methylpolysiloxane gum obtained in Example 1. No peroxide was added. The mixture was molded similarly, as in Example 3. The product did not hold together in the manner of a cross-linked product. When this heat-treated product was milled in a rubber mill, a thin paste was formed. This is also indicative of a non-vulcanized product.

It will, of course, be apparent to those skilled in the art that other convertible organopolysiloxanes can be compounded with hydrophobic silicas in the manner of the above examples. In addition other fillers, such as zinc oxide, titanium oxide, aluminum oxide, asbestos, iron oxide, etc., may be incorporated into the organopolysiloxane in addition to hydrophobic silica. The invention is not limited to the exact details shown and described, for obvious modifications will occur to those skilled in the art.

The best tensile strengths obtained were those resulting from heating convertible organopolysiloxane-hydrophobic silica compositions without the usual vulcanization agents. However, it is sometimes advantageous to have small amounts of peroxides present during the cure. For example, for rapid procedures, small amounts of peroxides, such as benzoyl peroxide, tertiary-butyl perbenzoate, etc., may be incorporated into the convertible organopolysiloxane-hydrophobic silica compositions. In this manner, a faster cure may be effected with a minimum of deleterious peroxide decomposition products.

Although I do not wish to be bound by this mechanism, it is believed that heating hydrophobic filler in the presence of organopolysiloxanes creates filler-organopolysiloxane bonds. Thus, the hydrophobic filler appears to be chemically incorporated into the elastomer. These filler-organopolysiloxane bonds may account for improved tensile strength.

The theory generally proposed for vulcanizing organopolysiloxanes with peroxides is the oxidation of one of the hydrogens in the silicon-bound methyl group and a cross-linking of organopolysiloxane molecules by methylene bridges. Therefore, it is believed that the nature of reaction with the hydrophobic filler is different from the reaction with peroxides. The non-peroxide mechanism is believed to be hydrophobic filler-organopolysiloxane linkages while the peroxide-hydrophobic silica mechanism is believed to be the combination of filler-organopolysiloxane linkages plus organopolysiloxane interlinkages.

The products of my invention may be used where silicone rubbers of good tensile strength and heat stability are required. They can be used in such applications as tubing, electrical insulation, shock absorbers, etc. They are particularly useful as gaskets in applications involving high temperatures specifically under hydrolytic conditions. Because of their improved heat resistance, they are valuable as materials for use in applications where natural or other synthetic rubbers may fail owing to the deleterious effect of heat. Elastomers produced by this invention have the additional property of retaining their flexibility at low temperatures, for example, at temperatures as low as —70° C.

What I claim as new and desire to secure by Letters Patent of the United States is:

1. A process of curing organopolysiloxanes which comprises heating an admixture of (1) an organopolysiloxane convertible to the cured, solid, elastic state, said organopolysiloxane containing silicon-bonded organo-substituents selected from the class consisting of hydrocarbons and halohydrocarbons and, as the sole curing agent, (2) a finely divided silica which has been rendered hydrophobic by esterification of the surface thereof with ethanol.

2. A process of curing an organopolysiloxane which comprises heating an admixture of (1) a dimethylpolysiloxane convertible to the cured, solid, elastic state and, as the sole curing agent, (2) a finely divided silica which has been rendered hydrophobic by esterification of the surface thereof with ethanol.

3. The product produced by the process of claim 2.

References Cited in the file of this patent

UNITED STATES PATENTS

| | | |
|---|---|---|
| 2,657,149 | Iler | Oct. 27, 1953 |
| 2,727,876 | Iler | Dec. 20, 1955 |
| 2,751,366 | Braendle | June 19, 1956 |
| 2,777,827 | Doede et al. | Jan. 15, 1957 |

OTHER REFERENCES

Chemical & Engineering News, volume 30, No. 45, November 10, 1952, page 4720.

Industrial & Engineering Chemistry, June 1953, pages 1297–1298.